(12) United States Patent
Hughey et al.

(10) Patent No.: US 6,596,945 B1
(45) Date of Patent: Jul. 22, 2003

(54) SUPERCONDUCTING CABLE

(75) Inventors: Raburn L. Hughey, Franklin, GA (US); Uday K. Sinha, Carrollton, GA (US); David S. Reece, Carrollton, GA (US); Albert C. Muller, Eidson, TN (US)

(73) Assignee: Southwire Company, Carrollton, GA (US)

( * ) Notice: Subject to any disclaimer, the term of this patent is extended or adjusted under 35 U.S.C. 154(b) by 0 days.

(21) Appl. No.: 09/392,278

(22) Filed: Sep. 9, 1999

Related U.S. Application Data (60) Provisional application No. 60/099,909, filed on Sep. 11, 1998.

(51) Int. Cl.[7] .............................................. H01B 12/00
(52) U.S. Cl. ..................... 174/125.1; 505/886; 505/887
(58) Field of Search ........................ 174/125.1; 505/230, 505/231, 704, 884, 885, 886, 887

(56) References Cited

U.S. PATENT DOCUMENTS 3,612,742 A * 10/1971 Snowden et al. .......... 174/15.5
5,932,523 A * 8/1999 Fujikami et al. ............. 505/231
5,952,614 A * 9/1999 Ries ........................ 174/106 R

* cited by examiner

*Primary Examiner*—Kamand Cuneo
(74) *Attorney, Agent, or Firm*—Herbert M. Hanegan; Dale Lischer; Eric J. Hanson (57) ABSTRACT

In order to provide a flexible oxide superconducting cable which is reduced in AC loss, tape-shaped superconducting wires covered with a stabilizing metal are wound on a flexible former. The superconducting wires are preferably laid on the former at a bending strain of not more than 0.2%. In laying on the former, a number of tape-shaped superconducting wires are laid on a core member in a side-by-side manner, to form a first layer. A prescribed number of tape-shaped superconducting wires are laid on top of the first layer in a side-by-side manner, to form a second layer. The former may be made of a metal, plastic, reinforced plastic, polymer, or a composite and provides flexibility to the superconducting wires and the cable formed therewith.

9 Claims, 4 Drawing Sheets

SUPERCONDUCTING CABLE

This application claims the benefit of provisional application Ser. No. 60/099,909, filed Sep. 11, 1988.

BACKGROUND OF THE INVENTION

1. Field of the Invention

The present invention relates to a superconducting cable employing a flexible oxide superconductor, and more particularly, it relates to forming a superconducting cable.

2. Description of the Background Art

Superconducting materials are those where the electric resistance approaches zero (1 uv/cm) below a critical temperature, its value depending on the material. Superconductivity is defined within a critical surface, i.e. a graph or figure with its axes being temperature, electrical current and magnetic field. Thus, for a given working temperature there is a defined curve of critical current which is a function of the magnetic field generated and/or applied to the superconductor.

The best known superconductor materials are NbTi and $Nb_3Sn$, however their working temperature is only 4.2K, the boiling temperature of liquid helium. This is the main limitation to large scale application of these superconducting materials. Such superconductors are therefore used almost exclusively for winding of magnets. Manufactured from wires (NbTi and $Nb_3Sn$) or tapes ($Nb_3Sn$) with high critical current densities (3500 $A/mm^2$ 5 Tesla for NbTi), such winding of compact magnets provide the production of high fields (up to 18 Tesla) in large volumes.

These superconductor magnets are used for the formation of medical images by nuclear magnetic resonance (MRI) and for materials analysis by the same principle (NMR), the magnets for ore separation and research magnets for high fields, such as those used in large particle accelerators (SSC, HERA, KEK, etc.).

Oxide superconductors of higher critical temperatures were discovered in 1986. These are intermetallic compounds involving metal oxides and rare earths, with perovskite (mica) crystal structure. Their critical temperatures vary from 30K to approaching room temperature and their critical fields are above 60 Tesla. Therefore these materials are considered promising and may replace $Nb_3Sn$ and NbTi in the manufacture of magnets and find other applications not feasible with liquid helium, such as transmission of electricity.

An oxide superconductor which enters the superconducting state at the temperature of liquid nitrogen would be advantageous for application in a superconducting cable having a cooling medium of liquid nitrogen. With such an application, it would be possible to simultaneously attain simplification of the thermal protection system and reduction of the cooling cost in relation to a superconducting cable which requires liquid helium.

A superconducting cable must be capable of transmitting high current with low energy loss in a compact conductor. Power transmission is generally made through an alternating current, and a superconductor employed under an alternating current would inevitably be accompanied by energy loss, generically called AC loss. AC losses such as hysteresis loss, coupling loss, or eddy current loss depends on the critical current density of the superconductor, size of filaments, the structure of the conductor, and the like.

Various types of superconducting cables have been experimentally produced using metallic superconductors to study the structures for reducing AC loss, such as a superconductor which comprises a normal conductor and composite multifilamentary superconductors which are spirally wound along the outer periphery of the normal conductor. The conductor is formed by clockwisely and counterclockwise wound layers of composite multifilamentary superconductors, which are alternately superimposed with each other. The directions for winding the conductors are varied every layer for reducing magnetic fields generated in the conductors, thereby reducing impedance and increasing current carrying capacity thereof. This conductor has a high-resistance or insulating layer between the layers.

When a cable conductor is formed using an oxide superconductor, the technique employed in a metal superconductor cannot be used. An oxide superconductor, i.e., a ceramic superconductor, is fragile and weak in mechanical strain compared with a metal superconductor. For example, the prior art discloses a technique of spirally winding superconductors around a normal conductor so that the winding pitch is equal to the diameter of each superconductor. However, when a superconducting wire comprising an oxide superconductor covered with a silver sheath is wound at such a short pitch, there is a high probability that the oxide superconductor will be broken, thereby interrupting the current. When an oxide superconducting wire is extremely bent, its critical current may also be greatly reduced.

The cable conductor must be flexible to some extent to facilitate handling. It is also difficult to manufacture a flexible cable conductor from a hard, fragile oxide superconductor.

SUMMARY OF THE INVENTION

An object of the present invention is to provide a superconducting cable having flexibility and exhibiting excellent superconductivity, particularly high critical current and high critical current density, having an oxide superconductor.

Another object of the present invention is to provide such a superconducting cable which is reduced in AC loss.

According to the present invention a superconducting cable is provided employing an oxide superconductor, which comprises a flexible core member, and a plurality of tape-shaped oxide superconducting wires which are wound on the core member, without an electric insulating layer between the superconducting wires or between the core member and the superconducting wires. In the inventive conductor, each of the oxide superconducting wires consists essentially of an oxide superconductor and a stabilizing metal covering the same. The plurality of tape-shaped superconducting wires laid on the core member form a plurality of layers, each of which is formed by laying a plurality of tape-shaped superconducting wires in a side-by-side manner. The plurality of layers are successively stacked on the core member. This core member provides the inventive superconducting cable with flexibility. The superconducting cable according to the present invention maintains a superconducting state at the temperature of liquid nitrogen.

The conductor according to the present invention further provides an AC conductor which is reduced in AC loss.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The present invention relates to a high temperature superconductor cable which may be used in the shielded or unshielded form of construction. There are many applications where both shielded and unshielded cables serve useful purposes.

A modification of this embodiment is to insulate the cable with dielectrics over the high temperature superconductor tapes and then provide another high temperature superconductor layer over the dielectric. The entire cable is then either introduced into a cryostat of the type described above or a cryostat is constructed over the cable. This coaxial construction forces the magnetic field to stay between the inner and the outer layers of high temperature superconductor tapes. There is substantially no magnetic field outside the high temperature superconductor tapes and therefore there is no eddy current in the outer metallic enclosures. With this construction very large amounts of current can be carried depending upon the number of tapes present in the cable. The limitation in this cable design is that the dielectric remains at the cryogenic temperature and a material which can withstand the cryogenic temperature without any physical and mechanical degradation has to be used. The polymeric dielectric material of one embodiment of the present invention has good physical and mechanical properties at liquid nitrogen and lower temperatures. It has high dielectric strength and high breakdown voltage. Advantageously the cable of the present invention includes the use of a flexible stainless steel corrugated pipe, which is optionally covered with a wire braid or mesh. Preferably, the corrugated pipe is drilled with holes of a size and pattern to allow the liquid nitrogen to flow into the butt gaps of the high temperature superconductor tapes and flood the dielectric material. The high temperature superconductor tapes are laid in a special manner to simulate two layer construction allowing maximum current to flow through the cable.

Figure 2:
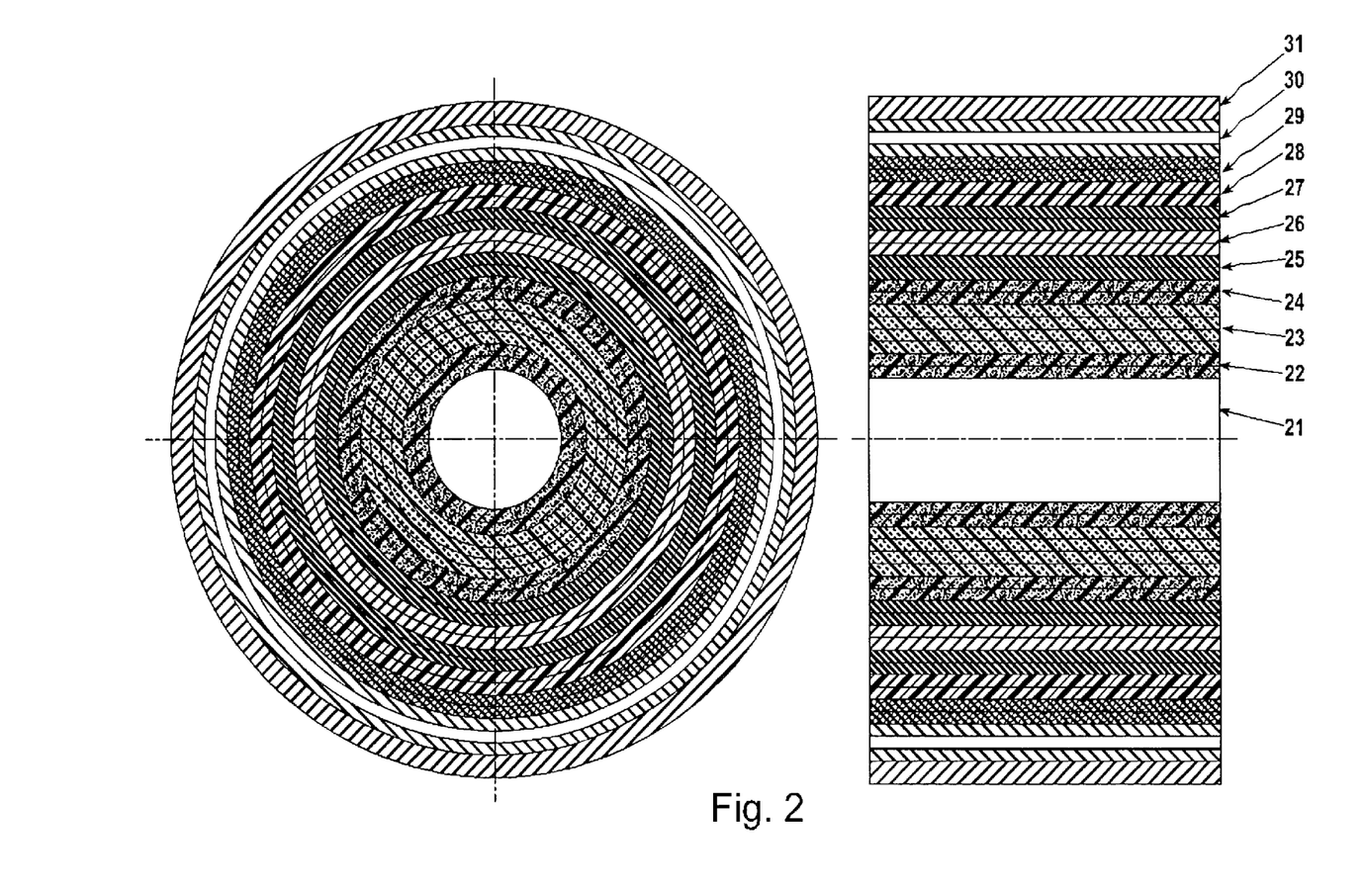
FIG. 2 is a sectional side view showing one embodiment of the present invention.
Figure 3:
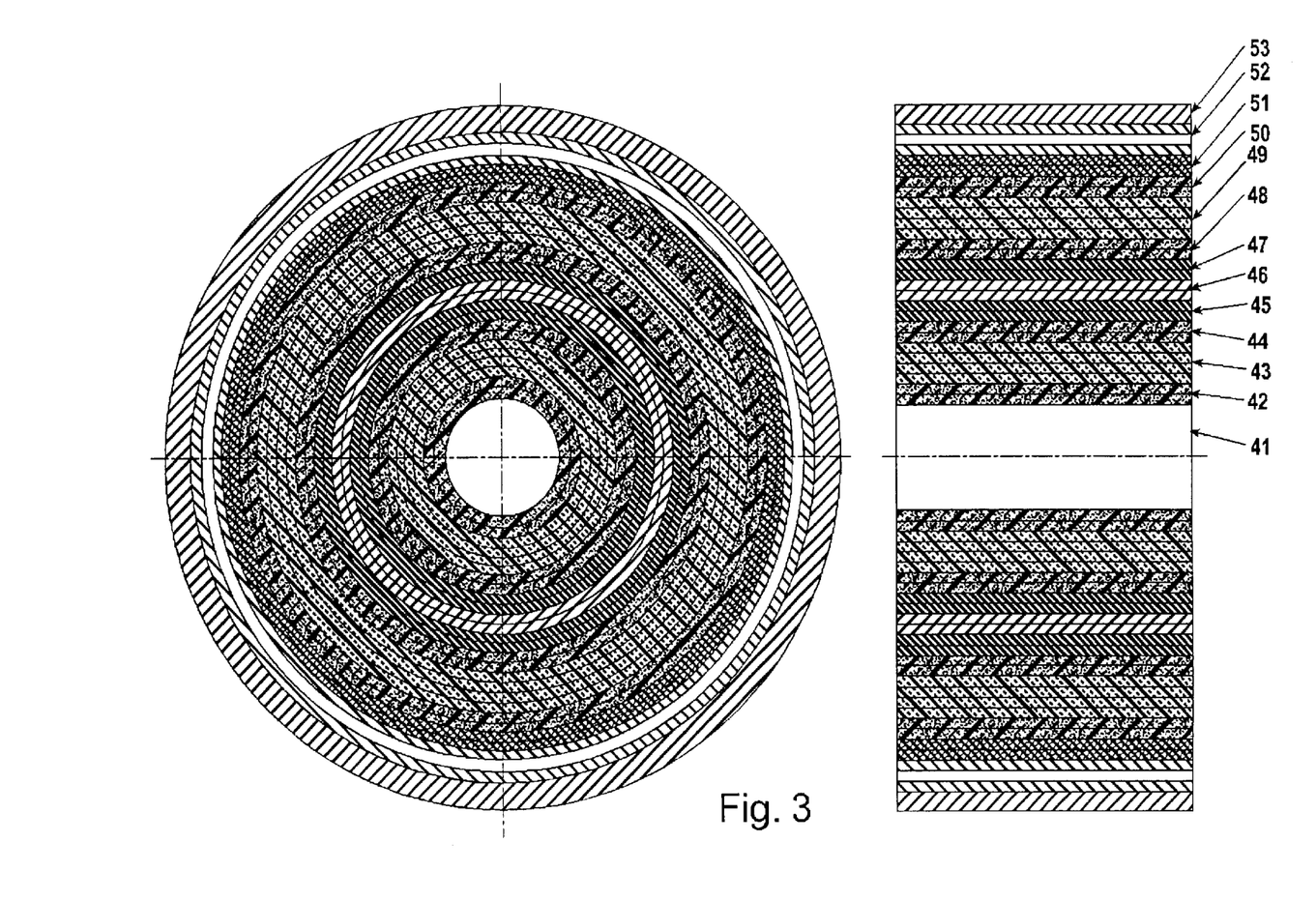
FIG. 3 is a sectional side view showing another embodiment of the present invention.

The dielectric material advantageously consists of semiconductive tape, aluminized shield tape, and polymeric dielectric tapes. A typical construction of a shielded cable is shown in FIG. 3. An unshielded cable can be constructed by omitting the outer layers of high temperature superconductor tapes. This cable construction is shown in FIG. 2. The present invention includes both shielded and unshielded high temperature superconductor cable. The design differs from other known cables in the case of an unshielded cable where an extrusion of dielectric material is performed over the thermal insulation cryostat. The prior art does not disclose any method of construction for shielded high temperature superconductor cable.

Figure 1:
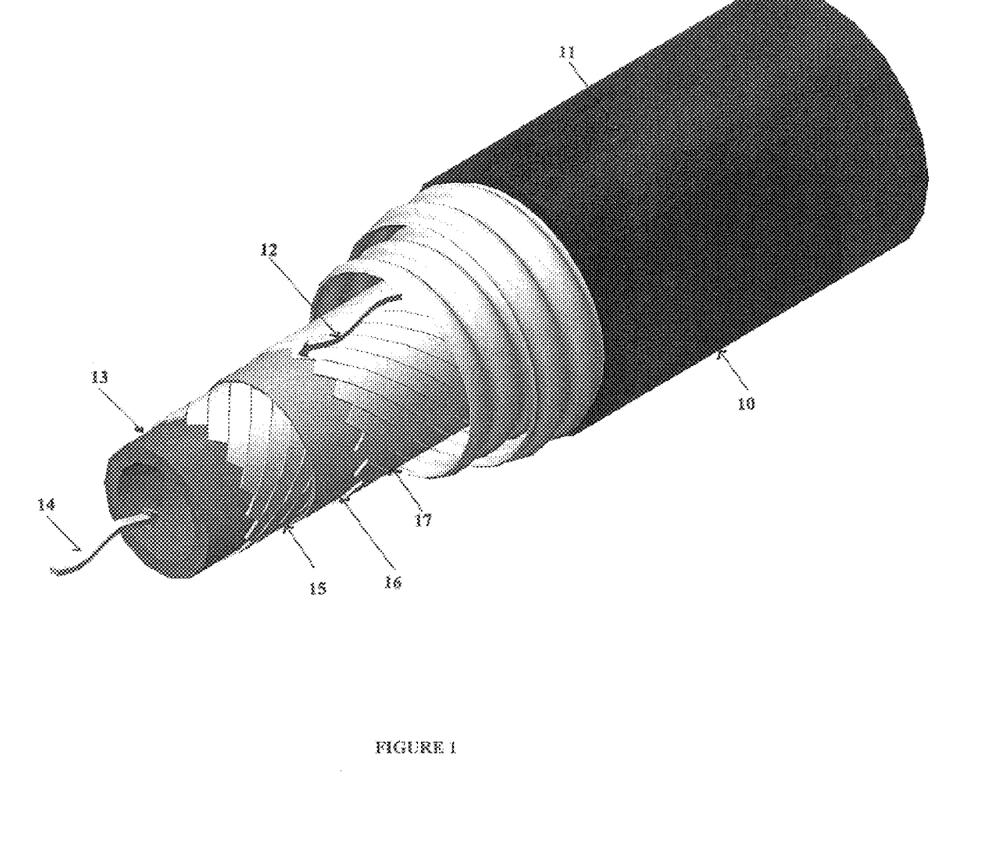
FIG. 1 is a perspective view showing the multilayer structure of the present invention.

Referring to FIG. 1, superconductor cable 10 is shown having flexible, evacuated double walled, outer pipe 11, through which liquid nitrogen, 12, flows to a chiller. Ground-potential superconductive shield material 17 encircles dielectric layer 16, which in turn surrounds current carrying superconductive material 15. The flexible, porous-walled former, 13, is encircled by superconducting material 15 and provides a central, tube-like portion for transport of liquid nitrogen from the chiller. In one embodiment former 13 further has a braided surface that contacts superconductive material 15.

FIG. 2 illustrates an embodiment of an unshielded cable wherein former 21 is surrounded by semiconductive bedding tape 22, upon which is laid superconductive tape 23. Another layer of semiconductive bedding tape 24 surround superconductor tape 23. Shielding layer 25 encircles bedding tape 24 and dielectric layer 26 surrounds shielding layer 25. Dielectric layer 26 is encircled by shield layer 27 which in turn is encircled by semiconductive bedding layer 28. Bedding layer 28 is surrounded by binder tape 29, which is encompassed by centering ring 30, in turn surrounded by jacketed cryostat 31.

Referring to FIG. 3, which shows an embodiment of a shielded cable, jacketed cryostat 53 encompasses centering ring 52, which surrounds binder tape 51, which in turn encircles semiconductive tape 50. Tape 50 encircles superconductive tape 49, which surround semiconductive bedding tape 48, which encompass shielding layer 47. Dielectric 46 encircles shield layer 45, which surrounds semiconductive tape 44. Superconductive tape 43 encircles semiconductive bedding tape 42, which surrounds former 41.

The present invention relates to a cable employing an oxide superconductor comprising a flexible core member, a plurality of tape-shaped oxide superconducting wires laid on said core member with tension of not more than about 2 kgf/mm$^2$ and a bending strain of not more than about 0.2% on the superconductor, wherein each tape-shaped superconducting wire consists essentially of an oxide superconductor and a stabilizing metal covering the same, said plurality of tape-shaped superconducting wires forming a plurality of layers each being formed by laying said tape-shaped superconducting wires in a side-by-side manner, said plurality of layers being successively stacked on said core member without an insulating layer between the plurality of layers and the core member, said core member providing said superconducting cable with flexibility, said superconducting cable capable of maintaining a superconducting state at the temperature of liquid nitrogen, said wires having substantially homogeneous superconducting phases along the longitudinal direction of said wire, the c-axes of said superconducting phases being oriented substantially in parallel with the direction of thickness of said wire, said superconducting wires being formed by grains aligned in parallel extending along the longitudinal direction of said wire, said grains being stacked along the direction of thickness of said wire.

The superconducting cable advantageously has flexibility such that its superconductivity does not substantially deteriorate upon bending up to about 50 times the diameter of the cable. It is also advantageous that the core member be selected from the group consisting essentially of metals, plastics, reinforced plastics, polymers, and composites. One embodiment of the superconducting cable provides a core member being a pipe having a spiral groove surface, a web shaped surface, a mat shaped surface, or a braid shaped surface on its exterior which forms a surface for the tape-shaped superconducting wires. The inventive superconducting cable does not have any insulating layer between the plurality of layers of the tape-shaped superconducting wires. Advantageously the tape-shaped wires are laid on said core member with the tape-shaped plurality of layers being laid on the surfaces formed by said immediately prior layer of tape-shaped wires. In another embodiment the wires are twisted within said tape-shaped stabilizing metal covering. Advantageously in the superconducting cable said tape-shaped wires are laid at a lay angle of up to about 90 degrees, advantageously from about 10 to about 60 degrees, and preferably from about 20 to about 40 degrees. One embodiment of the present invention includes a superconducting cable having at least two distinct groups of tape-shaped wire layers Advantageously the lay angle of each successive layer of tape-shaped wires alternate in lay direction or pitch; and each said successive layer consists of at least two tape-shaped wires. Advantageously, a layer of dielectric material separates each of the at least two distinct groups of tape-shaped wire layers. Preferably, a layer of dielectric material separates the core member from the layer of tape-shaped wires closest thereto. Advantageously, the dielectric material is selected from the group consisting of polypropylene, polyethylene, and polybutylene. In one embodiment of the present invention the at least two distinct groups of tape-shaped wire layers carries approximately equal amounts of the current flowing through the cable. Also advantageous is where the group of tape-shaped wire layers furthest from the core member provides shielding of the current flowing through the other layers and reduces magnetic fields or eddy currents in the cable. Preferably, the stabilizing metal used in the present invention is selected from the group consisting of silver, silver alloys, and nickel and nickel alloys, which may require a buffer layer.

Included in the present invention is an embodiment in which each tape-shaped multi filamentary oxide superconducting wire has such a structure that is a number of filaments consisting essentially of an oxide superconductor contained in a stabilizing material of silver, silver alloys, nickel and nickel alloys. The oxide superconductor may be prepared from an oxide superconductor such as bismuth, strontium, calcium and copper oxide.

Advantageously, each of said plurality of layers contains at least 2 tape-shaped silver contained wires per layer. Preferably, each of said plurality of layers contains at least 4 tape-shaped wires per layer. One embodiment of the present invention includes an insulating layer between the second and third layer of said plurality of layers. Where there are more than 4 layers, advantageously, an insulating layer is present between each second and third layer of said plurality of layers.

In the inventive conductor, the core member, which is generally called a former, is adapted to hold the tape-shaped superconducting wires at a bending strain of the prescribed range. This former has a length which is required for the superconducting cable conductor, and is provided at the center of the superconducting cable conductor. The former is in a substantially cylindrical or spiral shape so that the tape wires are laid thereon, and generally has a substantially constant diameter along its overall length. The former can consist essentially of at least one material selected from the group consisting of metals such as stainless steel, copper, aluminum and the like and plastics, reinforced plastics and ceramics.

According to the present invention, the former is preferably in the form of a tubular member having flexibility. It is also possible to employ a pipe having a spiral groove (hereinafter referred to as a spiral tube) as a former having sufficient strength and flexibility. A bellows tube having a bellows may also be employed as a former. Further, the former can also be prepared from a spirally wound material such as a spiral steel strip. Each of these shapes is adapted to provide the former with sufficient flexibility. The flexible former provides the inventive conductor with flexibility. The flexible conductor of the present invention can be taken up on a drum.

When practicing the present invention, it is possible to lay or wind several tape-shaped multifilamentary superconducting wires on the former. The tape wires may be laid in two or more layers while directing a surface thereof to the former. Each layer may be formed by an arbitrary number of the tape wires. When several tape wires are laid on the former in parallel with each other so that the surface of the former is filled up with the tape wires, additional tape wires are further wound thereon. When a sufficient number of tape wires are wound on the first layer of the tape wires as a second layer, a third layer of tape wires are then wound thereon. No insulating layer is provided between each adjacent pair of layers.

In the present inventive method, each tape-shaped multifilamentary oxide superconducting wire is laid or wound on a former having a prescribed diameter at a bending strain or a curvature of a prescribed range and a pitch of a prescribed range. A relatively loose bending is applied to the tape wire along its longitudinal direction. The tape wire which is wound on the former is bent at a bending strain of not more than 0.4%, preferably not more than 0.3%. Superconductivity of the tape wire is not substantially reduced upon bending at a bending strain of such a range, as compared with that in a linear state.

The present invention it is preferable to adjust the pitch and the diameter of the former so that the bending strain of the superconductive wire is not more than 0.2%. Each tape-shaped multifilamentary oxide superconducting wire is preferably wound on the former with tension of not more than 2 kgf/mm.$^{-2}$ in a range of 0.5 to 2 kgf/mm$^{-2}$.

The core member (former) can be formed by either an electric insulating material or an electric conductor. The electric insulating material is preferable in consideration of reduction in AC loss, while a metal which is a conductor is preferable in consideration of strength. A metal pipe having a spiral groove or a metal bellows tube may be used as the core member for providing the conductor with flexibility while maintaining constant strength. A metal core member can also be employed for safety in the case of an accidental abnormal current. In this case, it is possible to set optimum resistivity of the core member in consideration of AC loss of the conductor and the core member for the abnormal current.

When a metal pipe, which optionally may have a spiral groove, or a metal bellows tube is employed as the core member, the conductor can further comprise a metal tape which is laid or wound on the core member, and dielectric tape which is laid on a the outside surface of the metal tape. The metal tape can form a smooth surface for covering any grooves of the core member so that the superconducting tapes do not buckle. It is possible to cover any grooves while maintaining flexibility of the core member by laying the metal tape.

According to the present invention, it is possible to employ tape-shaped multifilamentary wires each having twisted filaments. The filaments forming a superconducting multifilamentary tape are twisted at a prescribed pitch. Due to such twisting of the filaments, an induction current flowing between a stabilizing metal and the filaments is parted every twisting pitch into small loops, and hence the value of the current is limited. Thus, generation of Joule heat is suppressed in the stabilizing metal and AC loss is reduced as compared with a superconducting wire having untwisted filaments.

The superconducting cable conductor according to the present invention has such flexibility that its superconductivity is substantially not deteriorated also when the same is bent up to 50 times the diameter of the cable. This conductor can be wound on a drum, to be stored and/or transported.

The present invention also makes it is possible to provide a long oxide superconducting cable conductor having flexibility as well as excellent superconductivity. In the present invention, an eddy current or a coupling current transferred between and flowing across the superconducting tapes is suppressed by the second or subsequent layer of tube-shaped superconductive wires which is provided according to one embodiment of the present invention. The present invention provides a practical AC superconducting cable conductor.

Advantageously the superconductor material is a granulated ceramic inserted into a silver tube which is then drawn to about 1 to about 2 mm. A number, depending on the desired capacity of the final cable, of these small drawn tubes are then inserted into a silver tube which is drawn to the desired size for use. Optionally, such tube may first be cut into sections and then added to the second silver tube before drawing. This thin, silver, flat tape-shaped material is from about 80 to about 60 percent silver and about 20 to about 40 percent ceramic by weight, advantageously, about 65 percent silver and about 35 percent ceramic.

The present invention also relates to a novel process or method which produces polymeric tapes suitable for use in a cryogenically operated superconducting power cable and the tapes so produced. The processing includes biaxially orienting either a polyethylene, polypropylene, or polybutylene film which has a maximum dielectric constant of about 3.0 and embossing said film with a random pattern. The combination of low dielectric constant, biaxially oriented, embossed film yields a polymeric material which overcomes the problems of brittleness, crazing, and excessive shrinkage which renders polymeric materials produced by known processes unusable in cryogenically operated power cable systems. In addition, the embossing of the film permits the relatively free flow of dielectric fluid within the cable.

The polyolefin sheet stock is biaxially oriented before use in the cable of the present invention. This involves stretching the sheet to a draw ratio of between about 5 to 1 and about 10 to 1 in the length direction and also orienting the sheet across their width.

The sheet, and tapes obtained therefrom which results from processing polyolefin stock to appropriate draw ratios has numerous qualities which make it superior for cable manufacture. To reduce the tape's tendency to fibrillate, to split over its entire length along a single tear, further processing is desirable. This processing involves a biaxial orientation in the direction across the sheet. This orients the sheet to a ratio of up to about 50% in the cross-sheet direction, and produces tape which is sufficiently biaxially oriented to satisfactorily limit the tendency to fibrillate.

The polyethylene, polypropylene and polybutylene tapes produced from the processing noted above are embossed with a particular pattern under specific conditions to assure proper cable impregnation and heat transfer. The embossing pattern consists of random or irregular channels, primarily directed in the cross machine direction. The tapes are cut from or otherwise obtained from the oriented sheet and may be used as single or multiple layer or laminate tapes. At the same time the pattern, while it may permit some impregnant flow in both the machine and cross-tape direction, favors cross-tape flow and flow between butt gaps because such flow enhances impregnation from layer to layer and encourages heat transfer by convection. The cable itself is constructed of multiple layers of polyolefin tape, either polyethylene, polybutylene or polypropylene. To facilitate cable bending, different widths of polyolefin tape may be used in the layers. The sizes may progress to larger widths with increased distance from the conductor of the cable.

The polyethylene, polypropylene, or polybutylene film of the present invention has a dielectric constant no greater than about 3.0, with about 2.3 being the preferred maximum. The first processing step consists of biaxial orientation, or drawing, advantageously at a ratio of from about 5:1 to about 6:1 in the machine direction and up to about 2:1 in the cross machine direction. Following orientation, the oriented tape is embossed at a temperature of from about 80° C. to about 140° C., which produces on the tape a pattern consisting of irregular or random channels primarily directed in the cross machine direction.

Polymeric tapes which have not undergone the novel processing steps described above have several inherent problems which make them unusable in cryogenically operated superconducting power cable systems. For example, in a liquid nitrogen environment at 77° K., most polymeric tapes become glass hard. This will lead to either tensile failure due to thermal contraction exceeding the inherent elongation or to simple disintegration of the tape. Another problem is crazing in liquid nitrogen. Liquid nitrogen, with a boiling point of 77° K., is known to be a powerful crazing agent for polymers. Crazing usually leads to stress cracking and ultimately fracture of the tape. The biaxial orientation process described above overcomes these problems of brittleness, excessive shrinkage, and crazing.

Many polymers exhibit two distinct modes of yielding. One type of yielding involves an applied shear stress, although the yield phenomenon itself is influenced by the normal stress component acting on the yield plane. The second type of yielding involves yielding under the influence of the largest principal stress. This type of yielding is frequently referred to as crazing, or normal stress yielding. Crazing can be induced by stress or by combined stress and solvent action. It shows generally similar features in all polymers in which it has been observed. Crazing appears to the eye to be a fine, microscopic network of cracks almost always advancing in a direction at right angles to the maximum principal stress. Crazing generally originates on the surface at points of local stress concentration. In a static type of test, it appears that for crazing to occur the stress or strain must reach some critical value. However, crazing can occur at relatively low stress levels under long-time loading.

It is known from extensive electron microscopic examination of crazed areas that molecular chain orientation has occurred in the crazed regions and that oriented fibrils extend across the craze surfaces.

To aid in the construction of the cable the otherwise highly transparent polyolefin insulating tape advantageously is produced with coloring added. This technique adds significantly to the ability to make a useable cable, because the operator must properly index each subsequent spiral layer of tape with the immediate previous layer. When taping with the typical extremely clear and transparent polyethylene, polybutylene or polypropylene tape, the operator is unable to distinguish the butt gaps of the immediate previous layer from other butt gaps as far as eight or ten tape layers beneath. The addition of selected color dyes in specific quantities adds enough color to the tape to permit the operator to easily distinguish the edges, the butt gaps, of the immediate previous layer of tape from those of the earlier layers because the darkness of the color increases significantly with each layer. This coloring agent is selected so as to minimize any increase in dissipation factor of the original material.

The width of the tapes may vary; narrow near the conductor and wider at the outside. The direction of lay may also be reversed at a certain radial thickness, a factor which depends on the design of the taping machine.

The dielectric tapes may be wound in overlapping spiral layers so that each butt gap between spirals of the same layer is offset from the butt gap of the layer below. This construction is facilitated by the production of the insulating tape containing color.

Polyolefin tapes such as polyethylene, polybutylene and polypropylene, when highly oriented as required for the present invention, are transparent. This clarity becomes a disadvantage when the butt gaps of many layers show through to the surface of, the cable very clearly. The operator then has difficulty distinguishing the butt gap of the immediate previous layer, from which each new butt gap must be offset, from other butt gaps deeper within the cable.

The tape of the present invention therefore has a color component added to it so that the deeper a layer is within the cable, the darker it appears. Organic dyes may be used to produce this color because these organic compounds, unlike inorganic metal salts, have less detrimental effect on the loss tangent and permittivity of the tape.

Since a balance between the needed color and effects on the electrical characteristics must be struck, organic dyes are added in the proportions ranging between 100 to 1000 parts per million.

This results in a reduction in the light transmission of the tape to 10 to 50 percent of the original transmission. When the tape is used on a cable this reduces the visibility to one to four layers, whereas without color, butt gaps as deep as eight to ten layers within the insulation are, still visible.

Orientation is accomplished in the machine direction by stretching or tentering of the sheet to produce a thickness reduction ratio of between 5 to 1 and 10 to 1.

The thickness reduction ratio is in fact a measurement of the linear sheet orientation and is an indication of the changing tensile characteristics of the polymer. The process is advantageously performed at temperatures of between about 80° C. and about 140° C.

The sheet is also processed to orient it in the cross-sheet direction to a reduction ratio of up to 50%. This is necessary because without such processing polymers tend to fibrillate, that is, to separate into individual fibers across their width and cause the tape to split lengthwise.

Polyolefin tapes resulting from the processing specified above, however, have a tensile modulus of at least 250,000 psi in the length (machine) direction, and meet all the criteria required for cable manufacture.

The tensile strength attained by the tapes through the processing is not only an indication of the resistance to deterioration, but also a necessity for the use on cable taping machines. Tapes processed as described above can therefore be used on conventional cable making machines with tensions great enough to construct a satisfactory tightly wound cable.

Before final construction into a cable, the polyolefin tape is embossed to furnish spacing between the tape layers which will facilitate relatively free flow of impregnants within the cable to enhance heat transfer.

Figure 4:
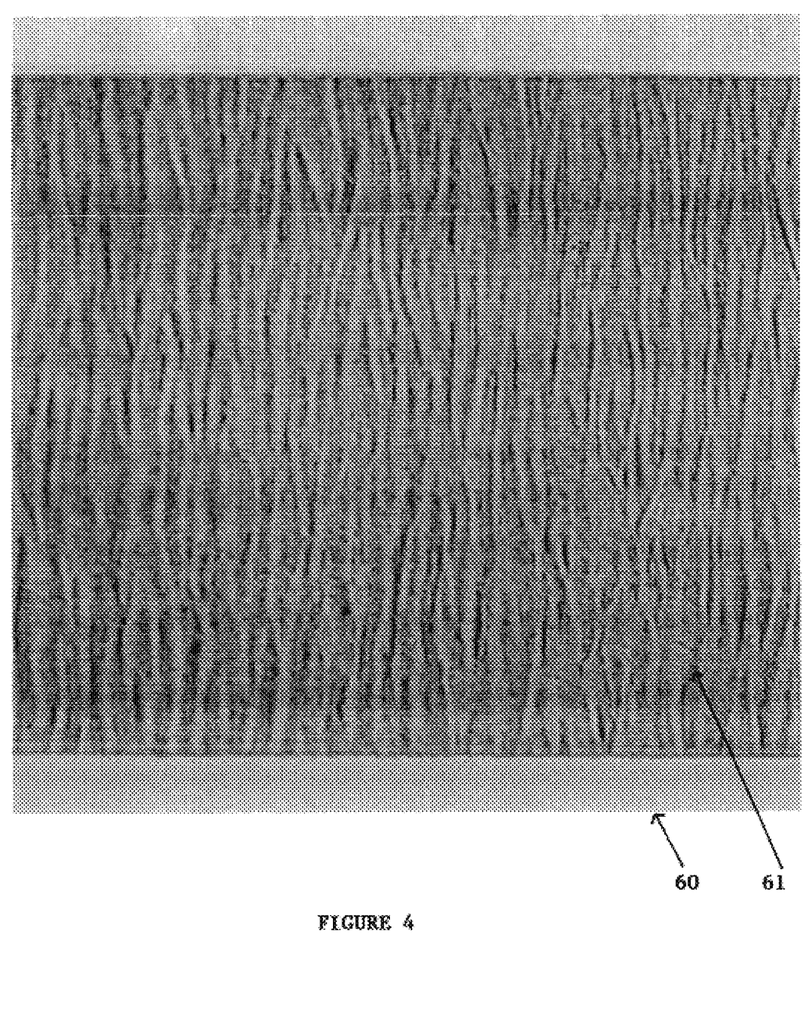
FIG. 4 is a depiction of the embossing pattern used in the present invention.

These goals are accomplished by a specific embossing technique. The tape is embossed advantageously by rollers. A typical pattern of embossing is shown in FIG. 4 which is a top view of a small section of tape 60 with valleys 61 in the pattern shown as dark lines.

The embossing pattern is characterized as irregular and preferentially permitting cross-tape flow of impregnant as opposed to flow along the length of the tape. The pattern of irregular valleys running essentially across the tape width as seen in FIG. 4 meets these criteria and, unlike a pattern of regular grooves or channels, it can not interlock adjacent tape layers. Non-uniform and irregular patterns therefore assure that the various tape layers can move small distances relative to each other and yield the degree of flexibility required to manufacture and install the cable.

The cross-flow favoring pattern provides heat transfer and impregnation capabilities for the cable. Although it is well understood that polymers are not permeable, the mechanism available for impregnation and heat transfer in the present cable does not depend upon the permeability of the material itself.

The embossed pattern is such that it can increase the effective tape thickness, that is, the peak to peak thickness may be twice the distance of the original tape thickness. The tape is then compressed during winding. Embossing is accomplished by rollers which cause a depression in one surface of the tape and a protrusion in the other surface. Once wound into a cable, these surface irregularities separate the tape layers; but since the pattern favors across-the-tape flow, impregnants need only flow, at the most, one-half the width of the tape to or from a butt gap where it can then progress to the next space between the tapes. This results in a relatively short path from the outside of the cable to the conductor.

Two typical patterns of embossing are: a coarse pattern with a typical 0.1 mm mid-height width of the valleys and a typical 0.2 mm spacing between adjacent peaks; and a fine pattern with typical 0.025 mm mid-height valley widths and typical 0.05 mm spacing between peaks.

Advantageously the superconducting cable of the present invention includes embossing the biaxially oriented dielectric material so as to form irregular and/or random channels therein. Preferably the dielectric material is embossed with channels having a depth of from about 0.5 to about 2 ml. In a preferred embodiment the embossing is performed by a roller at a temperature from about 80° C. to about 140° C. and the dielectric tape is embossed in a pattern which preferentially permits impregnant flow across the tape width. Most advantageously the dielectric tape is embossed in a pattern of irregular hills and valleys running across the tape.

The availability of embossing patterns ranging from coarse to fine allows the cable designer to strike a compromise between heat transfer and operating stress. The coarse pattern provides the best heat transfer with some reduction in operating voltage stress compared to the fine pattern and vice versa.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A cable employing an oxide superconductor, comprising: a flexible core member;
  a plurality of tape-shaped oxide superconducting wires being laid on said core member with tension of not more than 2 kgf/mm$^2$ wherein each tape-shaped superconducting wire consisting essentially of an oxide superconductor and a stabilizing metal covering the same, said plurality of tape-shaped superconducting wires forming a plurality of layers each being formed by laying a plurality of said tape-shaped superconducting wires in a side-by-side manner, said plurality of layers being successively stacked on said core member without an insulating layer between the plurality of layers and the core member, said core member providing said superconducting cable with flexibility, said superconducting cable capable of maintaining a superconducting state at the temperature of liquid nitrogen, said wires having substantially homogeneous superconducting phases along the longitudinal direction of said wire, the c-axes of said superconducting phases being oriented substantially in parallel with the direction of thickness of said wire, said superconducting wires being formed by grains aligned in parallel extending along the longitudinal direction of said wire, said grains being stacked along the direction of thickness of said wire, and wherein said core member is a pipe having a braid surface on its exterior which forms a surface for the tape-shaped superconducting wires.

2. The superconducting cable of claim 1, wherein an insulating layer is not present between the plurality of layers of tape-shaped wires.

3. The superconducting cable of claim 1, further including at least two distinct groups of tape-shaped wire layers.

4. The superconducting cable of claim 1, wherein the dielectric material is biaxially oriented at a ratio of from about 5:1 to about 10:1 in the machine direction.

5. The superconducting cable of claim 4, wherein the dielectric material is further biaxially oriented up to about 2:1 in the cross machine direction.

6. The superconducting cable of claim 4, wherein the dielectric material is biaxially oriented at a ratio of from about 5:1 to about 6:1 in the machine direction.

7. The superconducting cable of claim 4, including embossing the biaxially oriented dielectric material so as to form irregular and/or random channels therein.

8. The superconducting cable of claim 7, wherein the dielectric material is embossed with channels having a depth of from about 0.5 to about 2 mm.

9. The superconducting cable of claim 7, wherein the dielectric material is embossed in a pattern of irregular hills and valleys running across the tape.

* * * * *